(No Model.)
J. G. MOOMY.
PNEUMATIC TIRE.
No. 513,617. Patented Jan. 30, 1894.
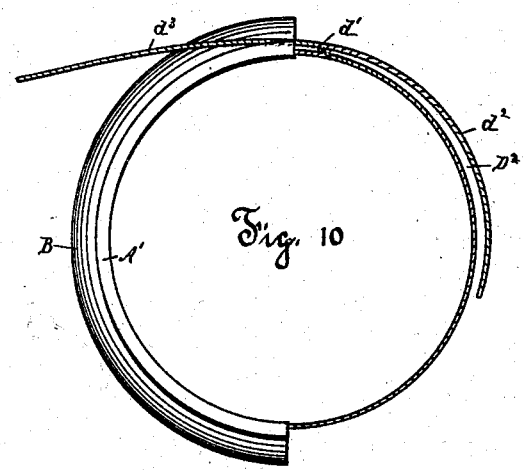
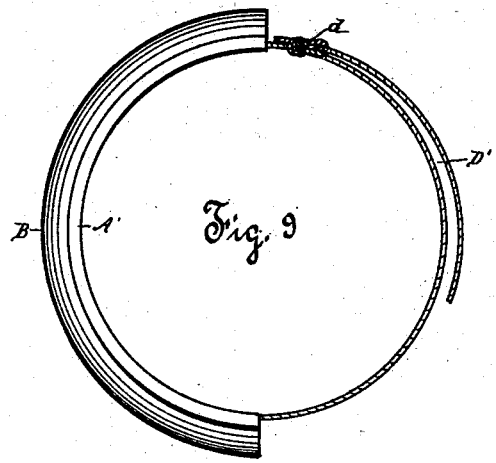
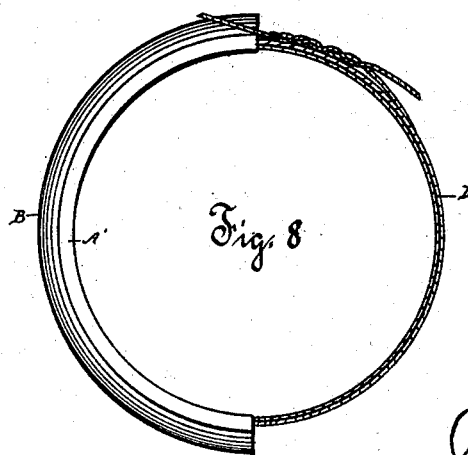
Witnesses
Inventor
Joseph G. Moomy
By Attorneys
Hallock & Halleck

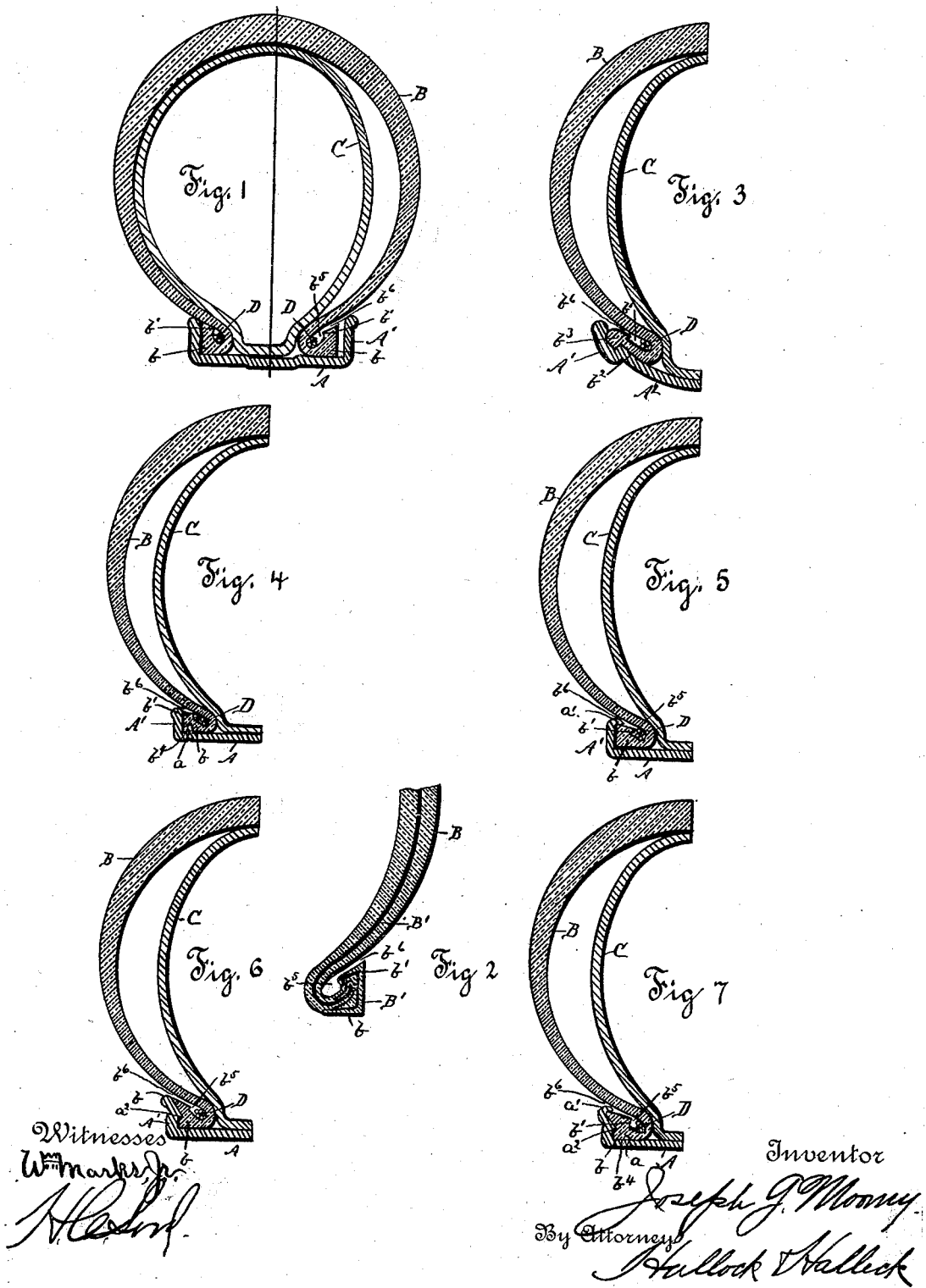

UNITED STATES PATENT OFFICE.

JOSEPH G. MOOMY, OF ERIE, PENNSYLVANIA.

PNEUMATIC TIRE.

SPECIFICATION forming part of Letters Patent No. 513,617, dated January 30, 1894.

Application filed November 20, 1893. Serial No. 491,461. (No model.)

*To all whom it may concern:*

Be it known that I, JOSEPH G. MOOMY, a citizen of the United States, residing at Erie, in the county of Erie and State of Pennsylvania, have invented certain new and useful Improvements in Pneumatic Tires; and I do hereby declare the following to be a full, clear, and exact description of the invention, such as will enable others skilled in the art to which it appertains to make and use the same.

This invention relates to pneumatic tires, and consists in certain improvements in the construction thereof, as will be hereinafter fully described and pointed out in the claims.

More specifically my invention has relation to the fastening of the tire to the rim of the wheel, and particularly to that class of tires having flaps on their inner peripheries on which a binder is placed, binding them to the rim of the wheel, and other improvements hereinafter more fully set forth.

Figure 1 is a cross-section of a tire and rim made in accordance with my invention, the tire at the right of said figure being shown as deflated, and at the left as inflated. Fig. 2 is an enlarged sectional view of the tire flap. Fig. 3 shows a construction alternative with that shown in Fig. 1. Fig. 4 is a cross section of one side of a deflated tire, having features additional to those shown in Fig. 1. Fig. 5 is a like view of the tire, also having additional features to those shown in Fig. 1. Fig. 6 is a similar view showing a construction that is alternative to that shown in Fig. 5. Fig. 7 is a like view of the tire showing a construction containing all the features of the preceding figures. Fig. 8 is a side elevation of the tire and rim, half of which is cut away to show the binder and its mode of fastening. Fig. 9 is a like view showing an alternative binder. Fig. 10 is also a like view, and also showing an alternative binder.

A marks the rim of the wheel; A', the flanges of the rim; B, the tire casing; C, the air tube; and D, the binder. The rim is made laterally flat along the edges where the tire rests, and the flanges, A', are formed at an angle thereto, preferably a right angle, as shown in Fig. 1. The flap, $b$, is cast flat on the bottom so as to fit the flat surface of the rim, the outer edge of the flap being at an angle to conform to the angle of the flange to the rim. This flap is preferably so reinforced with duck, as shown by lines, B', in Fig. 2, and so vulcanized as to be as rigid as it can be conveniently handled. The flap is also preferably made of considerable lateral thickness with the binder recess, $b^5$, of considerable depth leaving only a thin stiff seat for the binder near the inner edge of the flap. Where a round bottomed flap or bead is used, it has a tendency to roll out from under the binder when the tire is inflated. By making the bottom of the flap flat and placing it on a like surface on the rim, this tendency is, to a large extent, overcome, the action if any, being rather a tipping action in which the binder must give enough to slip over the greatest diagonal thickness of the flap between the binder and the outside corner of the flap; and the leverage on the binder being less with this style of flap, a binder of less strength may be used. This is advantageous with any binder, but is particularly so with the binder hereinafter described and claimed. The flaps are made of gradually increasing thickness from the seat of the binder outward, so that when the flap is in place, the circumference of its upper side increases from the seat toward the outer edge. This makes the flap triangularly shaped, where the rim used is as shown in Fig. 1, the sides being on the rim and the flange, and the longest triangular side of the flap uppermost. With this construction, the binder, as the tire is inflated, slides or rolls up on this increasing thickness or circumference of the flap so that whatever slack or give there is to the binder is taken up, and the flap as a whole is held tightly in place. This feature is clearly shown in Fig. 1, the right side showing the position of the binder when first put in place before the tire is inflated, and the left side of the figure showing the position assumed when the tire is inflated. This feature, while operative to some extent with any binder, is particularly adapted to the binder shown and hereinafter described. The annular shoulder, $b'$, on the upper side of the flap forms the upper wall of the binder recess, $b^5$, and stops this slipping or rolling movement at the greatest diagonal thickness of the flap. Fig. 3 shows an alternative construction of flap and rim containing this feature. In this figure, $A^2$, marks the rim; $A^3$, the flange; $b^2$, the flap; and $b^3$, the shoulder at the upper side of the binder recess. In this construction the gradually increasing circumference toward the outer edge of the flap is given to the flap by the shape of the rim. From this it will be seen that the essential property of this feature is that the upper side of the flap should gradually increase in circumference from the seat on which the binder is placed while the tire is deflated, toward the outer edge of the flap, so that the binder can roll or slip up on the flaring surface of the flap so as to take up the give or slack.

In order that the tire may sustain a greater air pressure, when inflated, the annular rib, $a$, (shown in Fig. 4) may be placed on the rim outside of the binder D, and a groove, $b^4$, placed in the bottom of the flap to fit over the rib. It will readily be seen that this rib prevents the flap from tipping by keeping the bottom close against the flange, and so before the tire can become loose, the binder will have to be rolled up to the upper edge of the flap and the flap pulled up off the rib.

Independent of the rib, as shown in Figs. 5 and 6 or in combination with it, as shown in Fig. 7, a clincher annulus may be formed in the flange as an auxiliary to the binder in holding on the tire. Fig. 5 shows this annulus as $a'$ on the upper edge of the flange, and Fig. 6 shows it as a rib, $a^2$, in the flange.

Fig. 7 shows a flap containing all the hereinbefore described features, each operating as before stated.

These flaps come from the mold folded back in close proximity to the casing (as shown in Fig. 2) the normal position leaving a space, $b^6$, between them only sufficient to allow the binder to be inserted readily into the binder recess, $b^5$. By so molding the flap, it can be vulcanized much stiffer than would be practical were the flaps cast open and then turned into position as the binder is placed. This permits the use of a much lighter binder without danger of the flap pulling out from under it; and as the natural shape of the flap is the position desired when bound, the binder can be put in place much more readily. The binder is also pinched, when the tire is inflated, between the flap and the casing much tighter than would be the case with the open flap, as the natural elasticity of the material of the flap would have to be overcome. This makes it particularly desirable with the binder hereinafter described. The method or process of so molding the flap is not here shown or described, as it will form the subject matter of a separate application.

Any suitable binder and method of fastening it may be used, but I prefer the one shown, in which the binder is drawn tight upon its seat with any desirable hitch, and the ends tucked into the binder recess and held in place by frictional contact of the parts. In Figs. 8, 9 and 10, three common hitches are shown, Fig. 8 showing a binder that is wound around the flap a plurality of times, and Figs. 9 and 10 binders of one wrap with a sufficient lap at the ends to maintain the fastening. In all of them, the binder is drawn tight with the hitch and the ends tucked in. The lap at the ends should be of such length, that the initial friction between them and the flap will be sufficient to hold the binder tight on the deflated tire. As the tire is inflated the lap is pinched in the recess with the binder, and as the strain on the binder increases with the inflation of the tire, this pinching action also increases so that the lap and consequently the binder is securely held against slipping. This pinching action is so great with the flap shown, that if the laps are tucked in, and held tight until the inflation is fairly started, no hitch at all is required, the fastening being accomplished entirely by the pinching action of the walls of the recess upon the binder and laps.

While the above method of fastening can be accomplished with a binder wholly of wire, I prefer binders in which string forms at least the fastening ends, as wire will not stand, for any considerable time, the bending and twisting incident to the frequent unbinding and rebinding of the tire, while this can be done with a properly constructed string repeatedly without injury; and the laps at the ends will hold much better, as the frictional quality of the string is much greater than that of wire. The binders shown are made wholly of string, as a binder of wire with string ends will form the subject matter of a separate application. A string binder is much more pliable that the wire binder or metal band, and can be wound on much tighter than a wire binder on which there is no special mechanical means for tightening it. This is especially true of a binder that is wound several times around the flap as shown in Fig. 8; and a string binder of sufficient strength and durability can be made with much less weight than the wire binder or metal band; its initial cost is much less; and when used in connection with a flap with a gradually outwardly increasing circumference from the binder seat, there being no torsional strength to the string, it rolls rather than slides, and consequently finds more nearly its true position on the flap as the tire is inflated than would a wire or metal band. This ability to roll is also advantageous with the open flap, as when the binder is wound or placed on the flap unevenly, it allows the uneven part to roll to its true position, and the tendency of the wire or metal band to wear or cut the flap as it is drawn to its true position by the inflation of the tire is absent.

Where a binder having but a single turn is used it is difficult without special mechanical means, to wind and fasten it sufficiently tight on the flaps to keep the flap from drawing from under it. For that reason nearly all binders having but one turn are supplied with some mechanical means for tightening them; usually by threading the ends and securing them with nuts; and to operate these mechanical means some sort of tool is usually required, which must be carried, if it is desired to be able to remove the covering of the tire at any time and place. Moreover, the strain on the fastening end of the binder, must be sufficient not only to give it the proper force to retain the flap, but it must be sufficient to overcome the friction between it and the opposite side of the binder and to give to the opposite side of the binder sufficient force to maintain the flap at that point. For this reason the fasteners for such binders are usually cumbersome or the binders themselves much heavier than is necessary throughout the circumference.

By placing the flap on the rim and then winding a binder around several times, a mechanical power is acquired by reason of which the binder can be readily wound tight enough by hand. This mechanical power may be stated to be as follows: The binding force of the binder is the pressure it exerts upon the flap. If the binder has but one turn it exerts the pressure applied in winding it. If it is composed of two turns on different parts of the flap the total pressure on the whole flap is doubled, and if the second wrap is applied directly over the first, then the binding force upon the seat of the first is equal to the concentrative binding force of the first plus the binding force of the second. It will readily be seen that by multiplying the number of turns, applying the same force to each one upon the other, the contractive binding force is so multiplied that a binder of sufficient tightness can be readily wound on with the hands alone.

What I claim as new is—

1. In a pneumatic tire, the combination with the rim having a substantially laterally flat binding surface for the tire; of said tire having an outwardly turned triangularly shaped flap on its inner periphery, the base of the triangle resting on the flat binding surface of said rim and a binder on said flap and on said base.

2. In a pneumatic tire, the combination with the rim of the wheel having a flange on each side and a substantially laterally flat binding surface for the tire next to the flange which forms an angle with said binding surface; of the tire having an outward turned flap on its inner periphery provided with an angular shoulder on its outer edge in conformity with the angle of the flange to the rim, and a binder on said flap back of said shoulder which is interposed between said binder and flange.

3. In a pneumatic tire, the combination with the rim of the wheel, of the tire on which is an outwardly turned flap having a binding surface thereon which, when the flap is in place on the rim, normally extends outwardly with a gradually increasing circumference from an initial binder seat, and a binder initially placed on said binder seat.

4. In a pneumatic tire, the combination with the rim of the wheel, of the tire on which is an outwardly turned flap having a binding surface thereon which, when the flap is in place on the rim, normally extends outwardly with a gradually increasing circumference from an initial binder seat, and a binder wound a plurality of times around said binder seat.

5. In a pneumatic tire, the combination with the rim of the wheel, having a flange and a substantially laterally flat binding surface thereon next the flange; said flange forming an angle to said surface; of the tire having an outwardly turned triangularly shaped flap on its inner periphery, the base of the triangle resting against the rim and one side on the flange; and a binder on said flap.

6. In a pneumatic tire, the combination with the rim of the wheel having a substantially laterally flat binding surface thereon next the flange; an annular rib on said surface; and the flange forming an angle to said surface; of the tire having an outwardly turned flat bottomed flap that rests on said surface and against said flange, and having a groove therein to receive the annular rib on the rim; and a binder on said flap back of said rib.

7. In a pneumatic tire, the combination with the rim of the wheel having a substantially laterally flat binding surface thereon next the flange on which is an annular rib; and the flange forming an angle with said surface; of the tire having an outwardly turned flat bottomed triangularly shaped flap on its inner periphery, the base of which rests on the rim and a side against the flange, and having an annular groove therein to receive the annular rib on the rim; and a binder on said flap that is placed back of said rib.

8. In a pneumatic tire, the combination of the rim having a flange with a clincher annulus thereon; the tire having an outwardly turned flap that enters said clincher annulus; and a binder between the body of the tire and the flange and on said flap.

9. In a pneumatic tire, the combination of the rim having a substantially laterally flat binding surface thereon and a flange having a clincher annulus therein; the tire having an outwardly turned flat bottomed flap on its inner periphery that enters the clincher annulus when in position; and a binder between the body of said tire and flange and on said flap.

10. In a pneumatic tire, the combination of the rim having a substantially laterally flat binding surface thereon on which is an annular rib; the flange formed with a clincher annulus therein; the tire having an outwardly turned flat bottomed flap thereon that enters the clincher annulus on the flange and in which is a groove to receive the annular rib on the rim; and a binder on said flap back of said rib.

11. In a pneumatic tire, the combination with the rim of the wheel having a substantially laterally flat binding surface thereon next the flange; and the flange forming an angle to said surface; of the tire having an outwardly turned triangularly shaped flap on its inner periphery, the base of the triangle resting on said binding surface of the rim and having an annular rib, $b'$, on the upper side thereof opposite the greatest diagonal thickness of the flap; and a binder on said flap below said rib.

12. In a pneumatic tire, the combination with the casing thereof; of a stiffened binder flap that normally turns back in close proximity to said casing to substantially the same position when off said rim as assumed by said flap when in place upon said rim.

13. In a pneumatic tire, the combination with the rim of the wheel having a substantially laterally flat binding surface thereon; of the tire having a stiffened normally flat bottomed flap that normally turns back outwardly in close proximity to the tire and which rests upon said binding surface in substantially its normal condition; and a binder on the inner edge of said flap.

14. In a pneumatic tire, the combination with the rim of the wheel having a substantially laterally flat binding surface thereon next the flange; and the flange forming an angle to said surface; of the tire having a stiffened flap on the side thereof that contacts the binding surface of the rim, normally turns back in close proximity to the tire, and which has an angular shoulder on its outer edge in conformity with the angle of the flange to the rim; and a binder on said flap back of said shoulder.

15. In a pneumatic tire, the combination with the rim of the wheel having a substantially laterally flat binding surface next the flange; and the flange forming an angle with said surface; of the tire having a stiffened triangularly shaped flap at its side that contacts said binding surface of the rim with its triangular base, and normally turns back in close proximity to the tire; and a binder on the inner edge of said flap.

16. In a pneumatic tire, the combination with the rim of the wheel having a substantially laterally flat binding surface thereon next the flange; and the flange forming an angle with said surface; of the tire having a stiffened triangularly shaped flap at its side that contacts the binding surface of the rim with its triangular base, and normally turns back in close proximity to the tire; and a binder wound around the wheel upon said flap a plurality of times.

17. In a pneumatic tire, the combination with the rim of the wheel having a substantially laterally flat binding surface thereon next the flange, and also an annular rib on said surface; and the flange forming an angle to said surface; of the tire having a stiffened flat bottomed flap that contacts said binding surface and the flange that normally turns back in close proximity to said tire, and which has an annular groove that fits over the annular rib on the rim; and a binder on said flap that is back of said rib and on said flap when in place.

18. In a pneumatic tire, the combination with the rim of the wheel; of the tire having an outwardly turned flap on its inner periphery; and a binder in the space between said tire and flap and held circumferentially by a frictional fastener.

19. In a pneumatic tire, the combination with the rim of the wheel; of the tire having outwardly turned flaps on its inner periphery; and a string binder in the space between said tire and flap and on said flap that is held circumferentially by a frictional fastener.

20. In a pneumatic tire, the combination with the rim of the wheel; of the tire having outwardly turned flaps on its inner periphery; and binders in the space between said tire and flap and that are wound around said wheel upon said flaps a plurality of times and which are held circumferentially by a frictional fastener.

21. In a pneumatic tire the combination with the rim of the wheel; of the tire having an outwardly turned flap on its inner periphery; and a binder in the space between said tire and flap and on said flap that is held circumferentially by a frictional fastener, the grip of which is increased by the inflation of the tire.

22. In a pneumatic tire, the combination with the rim of the wheel; of the tire having an outwardly turned flap on its inner periphery; and a binder in the space between said tire and flap and wound around the wheel upon said flap a plurality of times, and which is held circumferentially by a frictional fastener, the grip of which is increased by the inflation of the tire.

23. In a pneumatic tire the combination with the rim of the wheel; of the tire having an outwardly turned flap on its inner periphery; and a binder in the space between the flap and tire and of greater length than the circumference of the wheel that is held circumferentially by the frictional contact of the ends of the binder upon its seat.

24. In a pneumatic tire, the combination with the rim of the wheel; of the tire having a flap on its inner periphery in which is a binder recess; and a binder on said flap in said recess of greater length than the circumference of the wheel that is held circumferentially by frictional contact of the ends of said binder with the walls of said recess.

25. In a pneumatic tire the combination with the rim of the wheel; of the tire having an outwardly turned flap on its inner periphery in which is a binder recess; and a binder on said flap that is wound around the wheel in said recess a plurality of times and which is held circumferentially by the frictional contact of its wraps with the walls of said recess.

26. In a pneumatic tire, the combination with the rim of the wheel; of the tire having a flap on its inner periphery in which is a binder recess; and a string binder on said flap in said recess of greater length than the circumference of the wheel that is held circumferentially by the frictional contact of the ends of said binder with the walls of said recess.

27. In a pneumatic tire, the combination with the rim of the wheel; of the tire having a flap on its inner periphery in which is a binder recess, the walls of which are drawn together by the inflation of the tire, whereby the pinching of the inclosed binder is increased; of the binder on said flap in said recess of greater length than the circumference of the wheel that is held circumferentially by the frictional contact of the ends of said binder with the walls of said recess.

28. In a pneumatic tire, the combination with the rim of the wheel; of the tire having a flap on its inner periphery in which is a binder recess, the walls of which are drawn together by the inflation of the tire, whereby the pinching of the inclosed binder is increased; and a binder wound around said wheel upon said flap in said recess a plurality of times and which is held circumferentially by the frictional contact of its wraps with the walls of said recess.

29. In a pneumatic tire, the combination with the rim, of the tire, an outwardly turned flap on said tire, and a string binder coiled or wound around said rim within the space between the flap and the tire.

30. In a pneumatic tire, the combination with the rim, of the tire, an outwardly turned flap on said tire, a string binder wound or coiled several times around said rim within the space between the flap and the tire.

31. In a pneumatic tire, the combination with the rim of the tire, an outwardly turned flap on said tire, and a binder wound or coiled several times around said rim within the space between the flap and the tire.

In testimony whereof I affix my signature in presence of two witnesses.

JOSEPH G. MOOMY.

Witnesses:
HENRY A. CLARK,
H. C. LORD.